(12) United States Patent
Taniguchi (10) Patent No.: US 12,145,584 B2
(45) Date of Patent: Nov. 19, 2024

(54) DRIVING ASSISTANCE METHOD AND DRIVING ASSISTANCE DEVICE

(71) Applicant: Nissan Motor Co., Ltd., Yokohama (JP)

(72) Inventor: Yohei Taniguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/563,249

(22) PCT Filed: May 28, 2021

(86) PCT No.: PCT/JP2021/020484
§ 371 (c)(1),
(2) Date: Nov. 21, 2023

(87) PCT Pub. No.: WO2022/249470
PCT Pub. Date: Dec. 1, 2022

(65) Prior Publication Data
US 2024/0262351 A1    Aug. 8, 2024

(51) Int. Cl.
*B60W 30/12* (2020.01)
*B60W 30/18* (2012.01)
*B60W 50/00* (2006.01)
*B60W 50/14* (2020.01)
*B60W 60/00* (2020.01)

(52) U.S. Cl.
CPC ...... *B60W 30/12* (2013.01); *B60W 30/18163* (2013.01)

(58) Field of Classification Search
CPC ....... B60W 30/18163; B60W 2420/42; B60W 2552/10; B60W 2552/40; B60W 2552/53; B60W 2555/60; G08G 1/167; G06N 3/045; G06N 3/08; G06V 2201/08; G06V 10/82; G06V 20/58; G06V 20/588
USPC ......................................................... 701/23
See application file for complete search history.

(56) References Cited

U.S. PATENT DOCUMENTS

| 10,515,552 B2 | 12/2019 | Miyata |
| 11,383,714 B2 | 7/2022 | Horiba et al. |
| 2018/0357904 A1 | 12/2018 | Miyata |

(Continued)

FOREIGN PATENT DOCUMENTS

| EP | 3971860 A1 | 3/2022 |
| JP | 2015-152386 A | 8/2015 |

(Continued)

*Primary Examiner* — Ian Jen
*Assistant Examiner* — Hossam M Abd El Latif
(74) *Attorney, Agent, or Firm* — Young Basile Hanlon & MacFarlane, P.C.

(57) ABSTRACT

A driving assistance method for performing a lane change of an own vehicle by autonomous travel control includes: calculating a target route along which the own vehicle is caused to travel to a destination; determining whether or not multiple lane changes are required to be performed successively for the own vehicle to travel in accordance with the target route; determining whether or not the lane change is performed by the autonomous travel control; and when a determination that, in a second or later lane changes among the multiple lane changes, a lane change is not performed by the autonomous travel control is included, not performing a first lane change by the autonomous travel control.

8 Claims, 4 Drawing Sheets

(56) References Cited

U.S. PATENT DOCUMENTS

| | | | |
|---|---|---|---|
| 2021/0009134 A1 | 1/2021 | Horiba et al. | |
| 2022/0001867 A1* | 1/2022 | Hashimoto | B60W 30/18154 |
| 2022/0289228 A1* | 9/2022 | Yamamoto | B60W 30/18163 |
| 2023/0159051 A1* | 5/2023 | Kato | B60W 10/20 |
| | | | 701/26 |

FOREIGN PATENT DOCUMENTS

| | | | | |
|---|---|---|---|---|
| JP | 2015-161518 A | | 9/2015 | |
| JP | 2019-001184 A | | 1/2019 | |
| JP | 2019036339 A | * | 3/2019 | |
| JP | 2020-050204 A | | 4/2020 | |
| JP | 2020-132005 A | | 8/2020 | |
| JP | 2020-163900 A | | 10/2020 | |
| JP | 2021-011254 A | | 2/2021 | |
| WO | WO-2020003452 A1 | * | 1/2020 | B60W 10/20 |

* cited by examiner

DRIVING ASSISTANCE METHOD AND DRIVING ASSISTANCE DEVICE

TECHNICAL FIELD

The present invention relates to a driving assistance method and a driving assistance device.

BACKGROUND

In JP 2021-011254 A, a vehicle control device that is capable of appropriately suppressing control in a scene where automated lane change of a vehicle is inappropriate is proposed. The vehicle control device restricts automated lane change when it is detected that a vehicle exists in a first region that has a length of a first distance in the longitudinal direction of a road with reference to a starting point of a specific road structure or a second region that has a length of a second distance in the longitudinal direction of the road with reference to the ending point of the specific road structure.

SUMMARY

However, when, in the case where, in the middle of multiple lane changes, it is found that remaining lane changes cannot be performed in an automated manner, a driver is demanded to perform manual driving operation, there is a risk that the driver is confused. An object of the present invention is to prevent switch from autonomous driving to manual driving in the middle of multiple lane changes from occurring.

According to an aspect of the present invention, there is provided a driving assistance method for performing a lane change of an own vehicle by autonomous travel control, the driving assistance method including: calculating a target route along which the own vehicle is caused to travel to a destination; determining whether or not multiple lane changes are required to be performed successively for the own vehicle to travel in accordance with the target route; determining whether or not the lane change is performed by the autonomous travel control; and when a determination that, in a second or later lane changes among the multiple lane changes, a lane change is not performed by the autonomous travel control is included, not performing a first lane change by the autonomous travel control.

According to an aspect of the present invention, it is possible to prevent switch from autonomous driving to manual driving in the middle of multiple lane changes from occurring.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION (Configuration)

Figure 1:
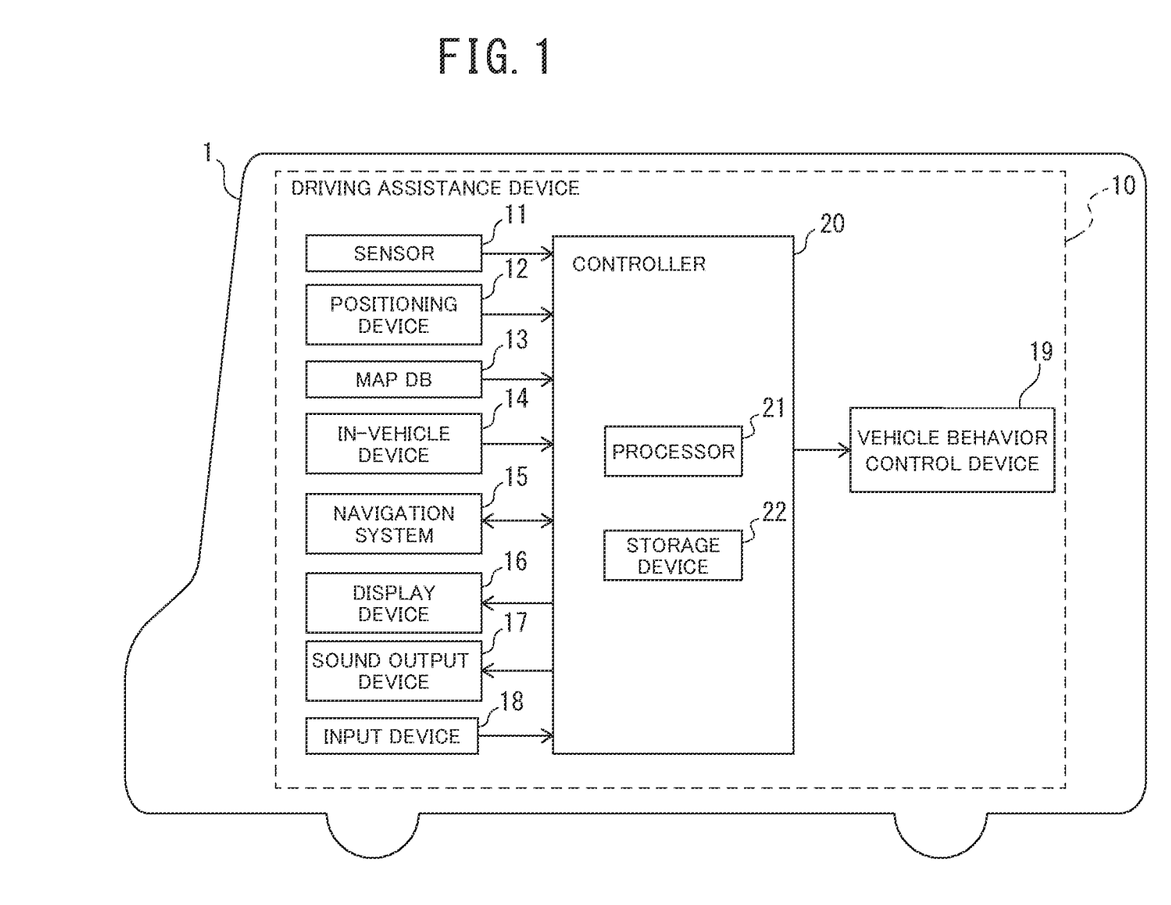
FIG. 1 is a diagram illustrative of an example of a schematic configuration of a vehicle on which a driving assistance device of an embodiment is mounted.

FIG. 1 is a diagram illustrative of an example of a schematic configuration of a vehicle on which a driving assistance device of an embodiment is mounted. A driving assistance device 10 mounted on a vehicle 1 includes a sensor 11, a positioning device 12, a map database (map DB) 13, an in-vehicle device 14, a navigation system 15, a display device 16, a sound output device 17, an input device 18, a vehicle behavior control device 19, and a controller 20. The above-described devices are connected to one another via, for example, a controller area network (CAN) or another in-vehicle LAN in order to perform transmission and reception of information with one another.

The sensor 11 detects a travel state of the vehicle 1. For example, the sensor 11 includes cameras, such as a front view camera for capturing a front view of the vehicle 1, a rear view camera for capturing a rear view of the vehicle 1, and side view cameras for capturing right and left side views of the vehicle 1. In addition, the sensor 11 includes radars, such as a front radar for detecting an obstacle in front of the vehicle 1, a rear radar for detecting an obstacle in the rear of the vehicle 1, and side radars for detecting an obstacle existing on the right and left lateral sides of the vehicle 1. Further, the sensor 11 includes a vehicle speed sensor for detecting vehicle speed of the vehicle 1, a touch sensor (capacitance sensor) for detecting holding of a steering wheel by a passenger (for example, a driver), an in-vehicle camera for imaging the passenger, and the like.

The positioning device 12 includes a GPS unit, a gyro sensor, a vehicle speed sensor, and the like. The positioning device 12 detects radio waves transmitted from a plurality of satellites by the GPS unit and periodically acquires position information of the vehicle 1. In addition, the positioning device 12 detects a current position of the vehicle 1, based on acquired position information of the vehicle 1, angle change information acquired from the gyro sensor, and vehicle speed acquired from the vehicle speed sensor.

The map database 13 is a memory that stores three-dimensional high-definition map information including position information of various types of facilities and specific points and is configured to be accessible from the controller 20. The three-dimensional high-definition map information is three-dimensional map information based on road shapes detected when a vehicle for data acquisition traveled on actual roads. The three-dimensional high-definition map information is map information in which detailed and highly precise position information of a curved road and the amount of curvature (for example, curvature or radius of curvature) of the road, a junction of roads, a branch point, a tollgate, a point of reduction in the number of lanes, and the like is associated with map information as three-dimensional information.

The in-vehicle device 14 is various types of devices mounted on the vehicle 1 and operates in accordance with an operation by the passenger. Examples of such an in-vehicle device include a steering wheel, an accelerator pedal, a brake pedal, turn signals, windshield wipers, lights, a horn, other specific switches, and the like.

The navigation system 15 acquires current position information of the vehicle 1 from the positioning device 12 and displays map information for navigation on which the position of the vehicle 1 is superimposed on a display or the like. In addition, the navigation system 15 includes a navigation function to, when a destination is set, set a route to the destination and guide the passenger along the set route. The navigation function displays a route on a map on the display and informs the passenger of the route by voice or the like. A route set by the navigation system 15 is also used in a route travel assistance function that the controller 20 includes. The route travel assistance function is a function to cause the vehicle 1 to autonomously travel to a destination, based on a set route.

The display device 16 includes, for example, a display that the navigation system 15 includes, a display incorporated in a rearview mirror, a display incorporated in a meter section, a head-up display projected on a windshield, and the like. The display device 16 notifies the passenger of various types of presented information in accordance with control by the controller 20.

The sound output device 17 is a device to output acoustic information, such as a speaker that the navigation system 15 includes, a speaker of an audio device, and a buzzer. The sound output device 17 notifies the passenger of various types of presented information in accordance with control by the controller 20.

The input device 18 is a device, such as a button switch that enables the passenger to input an operation by manual operation, a touch panel arranged on a display screen, and a microphone that enables the passenger to input an operation by voice. The passenger, by operating the input device 18, is able to input setting information in response to presented information presented by the display device 16 and the sound output device 17.

Figure 2:
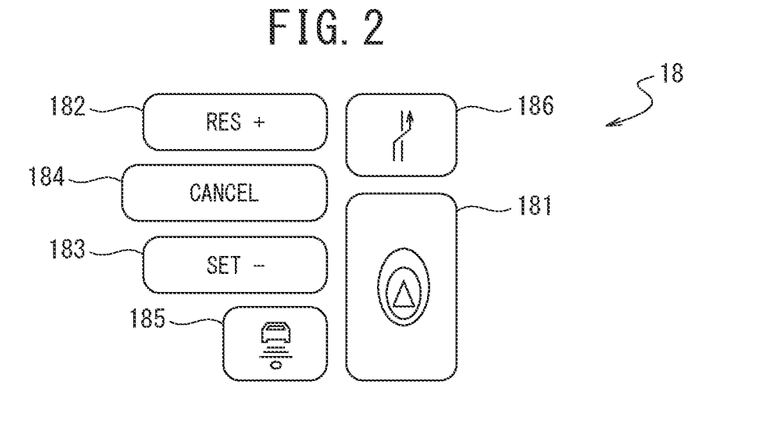
FIG. 2 is a diagram illustrative of a portion of an input device in FIG. 1.

FIG. 2 is a diagram illustrative of a portion of the input device 18 of the present embodiment. The input device 18 may be a button switch group that is arranged on, for example, a spoke of the steering wheel. The input device 18 is used when turning on and off and the like of an autonomous travel control function that the controller 20 includes are set. The input device 18 includes a main switch 181, a resume/accelerate switch 182, a set/coast switch 183, a cancel switch 184, an inter-vehicle distance adjustment switch 185, and a lane change assistance switch 186.

The main switch 181 is a switch to turn on and off the autonomous travel control function of the controller 20. The resume/accelerate switch 182 is a switch to, after the autonomous travel control function is turned off, set resumption of the autonomous travel control function at a set speed before the turning-off of the autonomous travel control function or to increase the set speed. The set/coast switch 183 is a switch to start the autonomous travel control function. In order to start the autonomous travel control function, after the autonomous travel control function is turned on by the main switch 181, the set/coast switch 183 is pressed. The set/coast switch 183 is also a switch to decrease the set speed. The cancel switch 184 is a switch to cancel the autonomous travel control function. The inter-vehicle distance adjustment switch 185 is a switch to set an inter-vehicle distance to a preceding vehicle. The lane change assistance switch 186 is a switch to, when the controller 20 confirms start of a lane change to the passenger, instruct (accept) the start of the lane change.

Note that, in addition to the button switch group illustrated in FIG. 2, a turn signal lever for the turn signals and a switch of another type of in-vehicle device 14 can be used as the input device 18. For example, when the passenger operates the turn signal lever in the case where whether or not a lane change is performed in an automated manner is proposed by the controller 20, a lane change in a direction in which the turn signal lever is operated is performed instead of the proposed lane change.

The vehicle behavior control device 19 controls vehicle behavior of the vehicle 1. For example, when the vehicle 1 performs constant speed travel at a set speed by the autonomous travel control function, the vehicle behavior control device 19 controls operation of a drive mechanism and brake operation to achieve acceleration/deceleration and travel speed that enable the vehicle 1 to travel at the set speed. In addition, when the vehicle 1 travels following a preceding vehicle by the autonomous travel control function, the vehicle behavior control device 19 also likewise controls the operation of the drive mechanism and the brake. Note that the operation control of the drive mechanism includes operation of an internal-combustion engine in the case of an engine-driven vehicle and operation of a motor for traveling in the case of an electric vehicle. In addition, the operation control of the drive mechanism includes torque distribution between an internal-combustion engine and a motor for traveling in the case of a hybrid vehicle.

In addition, when the vehicle behavior control device 19 performs lane-keeping control, a lane change assistance function, a passing assistance function, or a route travel assistance function, which will be described later, by the autonomous travel control function, the vehicle behavior control device 19 performs, in addition to the operation control of the drive mechanism and the brake, steering control of the vehicle 1 by controlling operation of a steering actuator.

The controller 20 is one or a plurality of electronic control units (ECUs) for controlling travel of the vehicle 1 and includes a processor 21 and peripheral components, such as a storage device 22. The processor 21 may be, for example, a central processing unit (CPU) or a micro-processing unit (MPU). The storage device 22 may include a semiconductor storage device, a magnetic storage device, an optical storage device, and the like. The storage device 22 may include registers, a cache memory, and a memory, such as a read only memory (ROM) and a random access memory (RAM), that are used as main storage devices.

Functions of the controller 20, which will be described below, are achieved by, for example, the processor 21 executing computer programs stored in the storage device 22.

Note that the controller 20 may be formed using dedicated hardware for performing various types of information processing that will be described below. For example, the controller 20 may include a functional logic circuit that is implemented in a general-purpose semiconductor integrated circuit. For example, the controller 20 may include a programmable logic device (PLD), such as a field-programmable gate array (FPGA), and the like.

The controller 20 achieves a travel information acquisition function to acquire information relating to a travel state of the vehicle 1 and an autonomous travel control function to autonomously control travel speed and/or steering of the vehicle 1. The travel information acquisition function of the controller 20 is a function to acquire travel information relating to a travel state of the vehicle 1. For example, the controller 20 may acquire, as the travel information, image information of the outside of the vehicle captured by the front view camera, the rear view camera, and the side view cameras in the sensor 11. In addition, the controller 20 acquires, as the travel information, detection results by the front radar, the rear radar, and the side radars. Further, the controller 20 also acquires, as the travel information, vehicle speed information of the vehicle 1 detected by the vehicle speed sensor in the sensor 11 and image information of the face of the passenger captured by the in-vehicle camera.

Further, the controller 20 acquires, as the travel information, the current position information of the vehicle 1 from the positioning device 12. In addition, the controller 20 acquires, as the travel information, a set destination and a route to the destination from the navigation system 15. Further, the controller 20 acquires, as the travel information, position information of a curved road and the amount of curvature (for example, curvature or radius of curvature) of the road, a junction of roads, a branch point, a tollgate, a point of reduction in the number of lanes, and the like from the map database 13. Moreover, the controller 20 acquires, as the travel information, information about operation of the in-vehicle device 14 by the passenger from the in-vehicle device 14.

The autonomous travel control function of the controller 20 is a function to autonomously control travel of the vehicle 1 without depending on operation by the passenger. The autonomous travel control function of the controller 20 include an autonomous speed control function to autonomously control travel speed of the vehicle 1 and an autonomous steering control function to autonomously control steering of the vehicle 1. The autonomous speed control function and the autonomous steering control function of the present embodiment will be described below.

<Autonomous Speed Control Function>

The autonomous speed control function is a function to, when a preceding vehicle is detected, control the vehicle 1 to travel following the preceding vehicle while performing inter-vehicle distance control in such a way as to keep an inter-vehicle distance matching vehicle speed with a vehicle speed set by the passenger as an upper limit. In contrast, when no preceding vehicle is detected, the autonomous speed control function controls the vehicle 1 to perform constant speed travel at a vehicle speed set by the passenger. The former and the latter are also referred to as inter-vehicle distance control and constant speed control, respectively. Note that the autonomous speed control function may include a function to detect a speed limit of a road on which the vehicle 1 is traveling from a road sign by the sensor 11 or acquire a speed limit from the map information in the map database 13 and automatically set the speed limit as a set vehicle speed.

The constant speed control is performed when it is detected by the front radar or the like in the sensor 11 that no preceding vehicle exists ahead in an own lane of the vehicle 1. In the constant speed control, the vehicle behavior control device 19 controls operation of the drive mechanism, such as the engine and the brake, in such a manner as to maintain a set traveling speed while feeding back vehicle speed data detected by the vehicle speed sensor.

The inter-vehicle distance control is performed when it is detected by the front radar or the like in the sensor 11 that a preceding vehicle exists ahead in the own lane of the vehicle 1. In the inter-vehicle distance control, the vehicle behavior control device 19 controls operation of the drive mechanism, such as the engine and the brake, in such a manner as to maintain a set inter-vehicle distance with a set travel speed as an upper limit while feeding back inter-vehicle distance data detected by the front radar.

<Autonomous Steering Control Function>

The autonomous steering control function is a function to perform the steering control of the vehicle 1 by controlling operation of the steering actuator.

The autonomous steering control function includes, for example, the lane-keeping function, the lane change assistance function, the passing assistance function, and the route travel assistance function. Note that, in the present invention, the autonomous steering control function is only necessary to include only the route travel assistance function, and the autonomous steering control function does not necessarily have to include the lane-keeping function, the lane change assistance function, and the passing assistance function.

The lane-keeping function is a function to assist steering of the passenger by controlling the steering actuator in such a way that, for example, the vehicle 1 travels along substantially the center of a lane.

When the set/coast switch 183 is pressed after the autonomous travel control function is turned on by the main switch 181, the controller 20 determines whether or not a predetermined autonomous travel control start condition is established. When the controller 20 determines that the autonomous travel control start condition is established, the controller 20 performs the lane-keeping function in the autonomous steering control function.

Alternatively, when the autonomous travel control start condition is established after the autonomous travel control function is turned on by the main switch 181, the controller 20 waits for the set/coast switch 183 to be pressed. When the set/coast switch 183 is pressed, the controller 20 starts the autonomous travel control and performs the lane-keeping function in the autonomous steering control function.

<Lane Change Assistance Function>

The lane change assistance function starts lane change operation that is a series of processing for automated lane change when the passenger operates the turn signal lever to turn on a turn signal and a predetermined lane change start condition is satisfied. The lane change assistance function determines whether or not the predetermined lane change start condition is established, based on various types of travel information acquired by the travel information acquisition function.

The lane change assistance function starts the lane change operation when the lane change start condition is satisfied. The lane change operation causes the vehicle 1 to laterally move to an adjacent lane and, when the movement to the adjacent lane is finished, turns off the turn signal and starts performance of the lane-keeping function in the adjacent lane.

<Passing Assistance Function>

When a preceding vehicle that is slower than the vehicle 1 exists ahead in the own lane of the vehicle 1 and a predetermined passing proposition condition is satisfied, the passing assistance function presents passing information to the passenger by the display device 16. In this configuration, the passing information is information for proposing passing the preceding vehicle to the passenger. The passing assistance function turns on a turn signal and starts the above-described lane change operation when the passenger accepts the passing by operating the lane change assistance switch 186 in the input device 18 in response to the presentation of the passing information and a preset passing start condition is satisfied. The passing assistance function determines whether or not the passing proposition condition and the passing start condition are established, based on various types of travel information acquired by the travel information acquisition function.

<Route Travel Assistance Function>

When a travel direction change point, such as a branch point, a junction, an exit, and a tollgate, exists in a set route, distance to the travel direction change point is within a predetermined distance, and a predetermined route travel proposition condition is satisfied, the route travel assistance function presents route travel information by the display device 16 and proposes a lane change toward the travel direction change point. In addition, the route travel assistance function starts lane change operation when the proposition of lane change is accepted by an operation of the lane change assistance switch 18b and a predetermined route travel start condition is satisfied.

The route travel assistance function determines whether or not the route travel proposition condition and the route travel start condition are established, based on various types of travel information acquired by the travel information acquisition function.

The route travel assistance function, in order to cause the vehicle 1 to travel in accordance with a route to a destination acquired from the navigation system 15, sometimes proposes successively performing successive and integrated multiple lane changes. As used herein, "successive and integrated multiple lane changes" means lane changes that are multiple times of lane changes performed in a section from a current travel lane to a destination lane in which the vehicle 1 after lane changes finally travels and in which all intervals between successive lane changes included in the multiple lane changes are less than or equal to a predetermined time or a predetermined distance.

Figure 3:
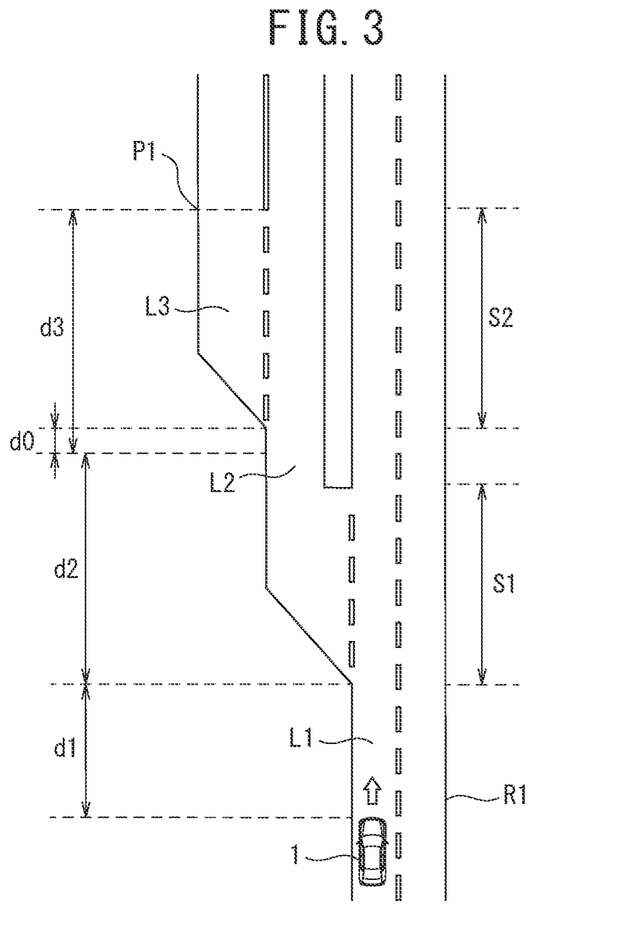
FIG. 3 is an explanatory diagram of an example of a driving scene in which multiple lane changes are performed.

With reference to FIG. 3, an example of a driving scene in which multiple lane changes are performed will be described. A state in which the vehicle 1 is traveling in a first lane L1 of a first road R1 is now assumed.

At a point ahead of the vehicle 1, the number of lanes increases caused by the first lane L1 branching into a second lane L2 and the first lane L1. For example, the second lane L2 may be a lane that branches off from the first road R1 and extends to a second road (not illustrated) bound for a direction different from that of the first road R1, and the vehicle 1 can reach the second road by traveling a not-so-long distance (for example, 1.5 km) from a point at which the first lane L1 and the second lane L2 branch off from each other.

In the following description, a section in which the number of lanes increases caused by the first lane L1 branching into the second lane L2 and the first lane L1 is referred to as "first lane increasing section S1".

Beyond the first lane increasing section S1, a second lane increasing section S2 in which the number of lanes increases caused by the second lane L2 branching into a third lane L3 and the second lane L2 exists. For example, the third lane L3 may be a lane that branches off from the second road and extends to a third road (not illustrated) bound for a direction different from those of the second road and the first road R1, and the vehicle 1 can reach the third road by traveling a not-so-long distance (for example, 1.5 km) from a point at which the second lane L2 and the third lane L3 branch off from each other.

When it is recommended for the vehicle 1 traveling in the first lane L1 to travel on the third road to go to a destination of the vehicle 1, the route travel assistance function proposes successive and integrated multiple lane changes including a lane change from the first lane L1 to the second lane L2 and a subsequently performed lane change from the second lane L2 to the third lane L3.

When multiple lane changes are performed as described above, there are some cases where although lane changes up to an intermediate lane change among the multiple lane changes can be performed by the autonomous steering control function, the remaining lane changes cannot be performed by the autonomous steering control function. Such cases include, for example, a case where distance between points at which lane changes are performed is short.

Demanding the passenger to perform manual driving operation in such a situation causes the passenger who has not expected to manually drive to be forced to perform operation without sufficient margin in a short period of time. In addition, there is a risk that the vehicle 1 travels in a direction different from a desired course since there is little margin for driving operation.

Thus, when, in the middle of multiple lane changes, the remaining lane changes are not performed by the autonomous steering control function, the route travel assistance function of the present embodiment does not perform (for example, prohibits) the first lane change by the autonomous travel control and generates information prompting the passenger to manually perform lane changes at a timing before the first lane change.

Since this configuration enables switch from autonomous driving to manual driving in the middle of multiple lane changes to be prevented from occurring, the passenger who is demanded to manually perform a lane change before the multiple lane changes can perform the multiple lane changes with sufficient margin.

Although an example in which when the second lane change is determined not to be performed by the autonomous travel control, the first lane change by the autonomous travel control is not performed will be described below, when the n-th (n is an integer of 3 or more) lane change is determined not to be performed by the autonomous travel control, the first to (n-1)-th lane changes by the autonomous travel control do not have to be performed.

Figure 4:
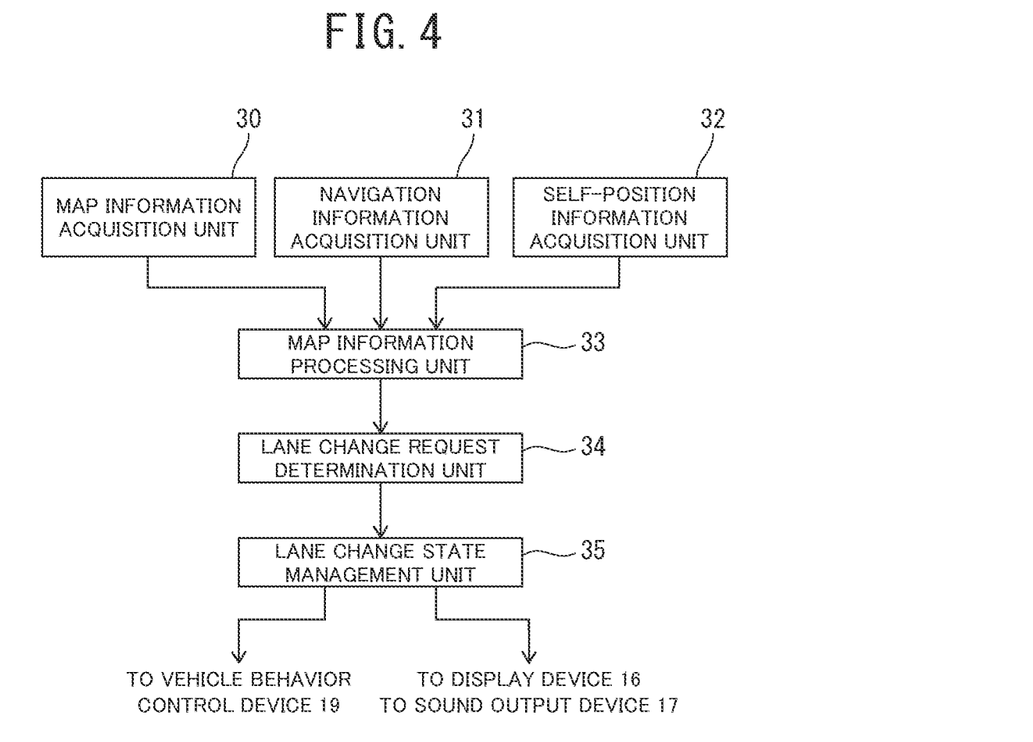
FIG. 4 is a block diagram of an example of a functional configuration of a route travel assistance function.

FIG. 4 is a block diagram of an example of a functional configuration of the route travel assistance function. The controller 20 functions as a map information acquisition unit 30, a navigation information acquisition unit 31, a self-position information acquisition unit 32, a map information processing unit 33, a lane change request determination unit 34, and a lane change state management unit 35.

The map information acquisition unit 30 acquires map information from the map database 13 or by a not-illustrated communication device. For example, the map information acquisition unit 30 may acquire, as the map information, three-dimensional high-definition map information and map information for navigation.

The navigation information acquisition unit 31 acquires route information relating to a route from the current position to a destination from the navigation system 15.

The self-position information acquisition unit 32 acquires current position information relating to the current position of the vehicle 1 from the positioning device 12.

The map information processing unit 33 acquires three-dimensional high-definition map information of a predetermined range around the current position of the vehicle 1 from the map information acquisition unit 30.

The lane change request determination unit 34 determines existence or nonexistence of a lane change request by the route travel assistance function.

The lane change state management unit 35 determines whether or not the above-described route travel proposition condition is satisfied when a lane change is determined to be requested by the route travel assistance function, based on a determination result by the lane change request determination unit 34. When the route travel proposition condition is satisfied, the lane change state management unit 35 presents route travel information by the display device 16 and proposes a lane change to a travel direction change point.

When the proposition of a lane change is accepted by an operation of the lane change assistance switch 186 and a predetermined route travel start condition is satisfied, the lane change state management unit 35 starts lane change operation. When a lane change is performed, the vehicle behavior control device 19 performs steering control of the vehicle 1 by controlling operation of the steering actuator, based on a command from the lane change state management unit 35.

The display device 16 and the sound output device 17 output a proposition of a lane change by the route travel assistance function and information prompting the passenger to manually perform lane changes.

Figure 5:
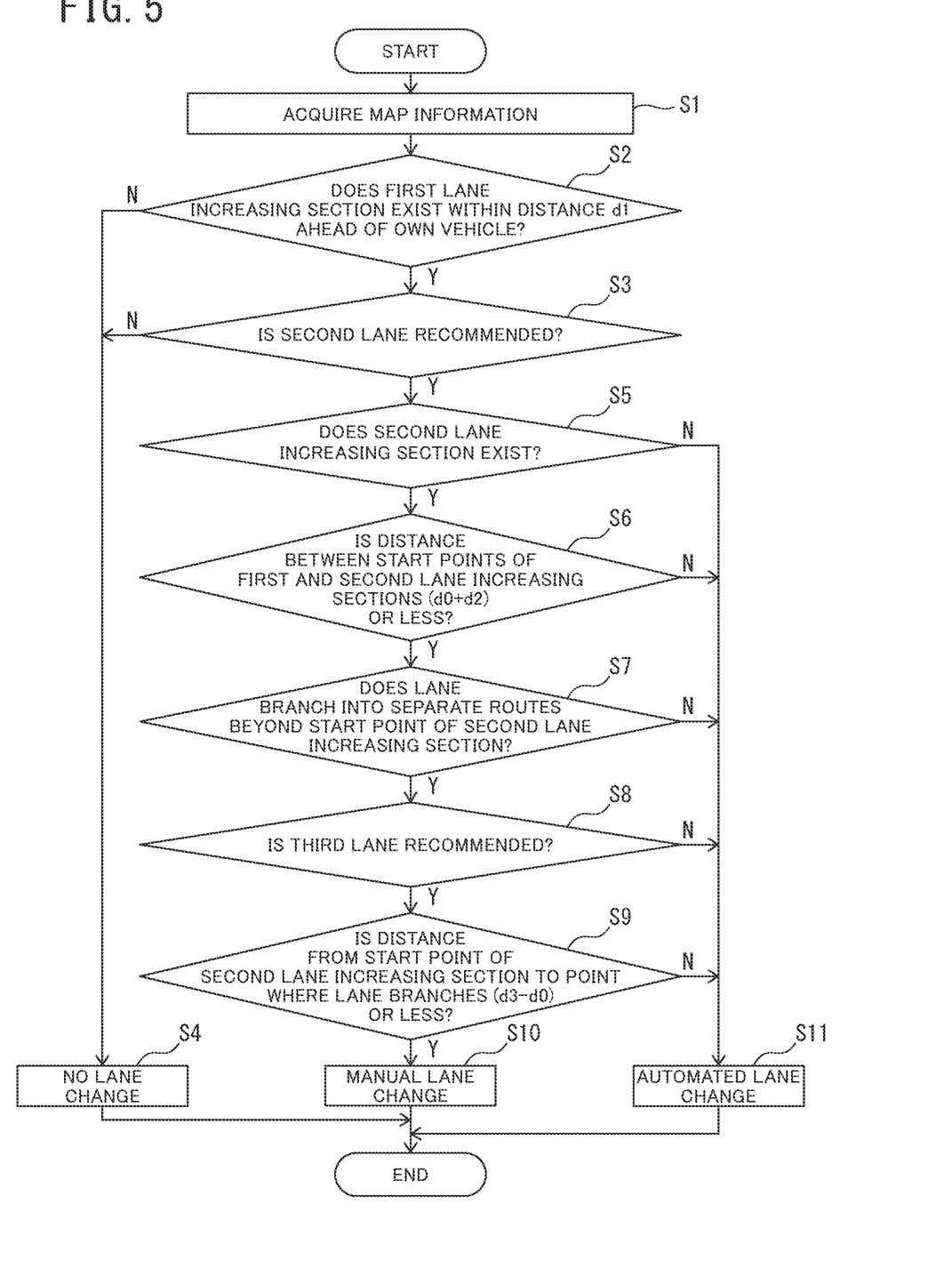
FIG. 5 is a flowchart of an example of a driving assistance method of the embodiment.

FIG. 5 is a flowchart of an example of a driving assistance method of the embodiment.

In step S1, the map information processing unit 33 acquires three-dimensional high-definition map information of a predetermined range around the current position of the vehicle 1 from the map information acquisition unit 30, based on route information acquired by the navigation information acquisition unit 31 and self-position information acquired by the self-position information acquisition unit 32. Specifically, the map information processing unit 33 acquires three-dimensional high-definition map information of a range from the current position of the vehicle 1 to a position a predetermined distance ahead of the current position. The predetermined distance may be, for example, 7 km.

In step S2, the map information processing unit 33 determines whether or not a first lane increasing section S1 exists within a predetermined forward distance d1 [m] from the current position of the vehicle 1 currently traveling in a first lane L1, based on the acquired map information.

The predetermined distance d1 may be set as, for example, distance from a point at which a lane change by the route travel assistance function is proposed (alternatively, a point at which the passenger is demanded to manually perform a lane change) to a start point of the first lane increasing section S1. The predetermined distance d1 may be, for example, 900 m.

When a first lane increasing section S1 exists (step S2: Y), the process proceeds to step S3. When no first lane increasing section S1 exists (step S2: N), the process proceeds to step S4.

In step S3, the map information processing unit 33 determines in which of the first lane L1 and a second lane L2 the route information acquired by the navigation information acquisition unit 31 recommends the vehicle 1 to travel. When the second lane L2 is recommended (step S3: Y), the process proceeds to step S5. When the first lane L1 is recommended (step S3: N), the process proceeds to step S4.

In step S4, the map information processing unit 33 determines that no second lane L2 to which the vehicle 1 is required to change the lane exists. The lane change request determination unit 34 determines to generate neither a proposition of a lane change by the route travel assistance function nor a demand of a lane change by manual operation by the passenger.

Based on the determination result by the lane change request determination unit 34, the lane change state management unit 35 does not start a lane change by the autonomous travel control and the display device 16 and the sound output device 17 output neither a proposition of lane change by the route travel assistance function nor information prompting the passenger to manually perform a lane change. Subsequently, the process terminates.

In step S5, the map information processing unit 33 determines whether or not a second lane increasing section S2 exists further beyond the first lane increasing section S1, based on the acquired map information. When a second lane increasing section S2 exists (step S5: Y), the process proceeds to step S6. When no second lane increasing section S2 exists (step S5: N), the process proceeds to step S11.

In step S6, the map information processing unit 33 calculates a distance between a start point at which lane width of the second lane L2 starts to increase in the first lane increasing section S1 (hereinafter, sometimes referred to as "start point of the first lane increasing section S1") and a start point at which lane width of the third lane L3 starts to increase in the second lane increasing section S2 (hereinafter, sometimes referred to as "start point of the second lane increasing section S2). The map information processing unit 33 determines whether or not distance between the start points is less than or equal to a first threshold value dt1 [m].

For example, as the first threshold value dt1, a sum (d0+d2) of distance d0 and distance d2, which are set as follows, may be set.

The distance d0 is set as distance from a point at which a lane change in which when the vehicle 1 performs a lane change to the third lane L3 by the autonomous travel control, the vehicle 1 moves to the third lane L3 in accordance with increase in the lane width of the third lane L3 is started to the start point of the second lane increasing section S2. For example, the distance d0 may be set as distance from a point at which turning-on of a turn signal notifying a lane change to the third lane L3 is started to the start point of the second lane increasing section S2.

The distance d0 may be set to, for example, a value within a range of −100 m to 100 m. For example, the distance d0 may be dynamically set according to an increase rate of the lane width of the third lane L3 in the second lane increasing section S2 with respect to positional change in the travel direction of the third lane L3 (that is, an increased amount of the lane width when the vehicle 1 travels a unit distance in the increasing section S2).

For example, the distance d0 may be set to a value in such a manner that the lower the increase rate of the lane width of the third lane L3 is, the larger the value becomes. In addition, the distance d0 may be dynamically set according to vehicle speed of the vehicle 1. For example, the distance d0 may be set to a value in such a manner that the lower the vehicle speed is, the larger the value becomes.

On the other hand, the distance d2 is set as a minimum allowable distance from the start point of the first lane increasing section S1 to a point at which a lane change in which the vehicle 1 moves to the third lane L3 in accordance with increase in the lane width of the third lane L3 in the second lane increasing section S2 by the autonomous travel control is started.

When it is determined that, since the distance from the start point of the first lane increasing section S1 to the point at which a lane change in which the vehicle 1 moves to the third lane L3 is started is short, the second lane change in which the vehicle 1 moves to the third lane L3 cannot be performed by the autonomous travel control, there is a risk that information prompting for manual lane change cannot be presented to the passenger at a timing with sufficient margin.

The distance d2 may be, for example, 200 m. However, since length of the distance d2 is determined depending on a sense of distance of the passenger, the distance d2 may be varied according to various factors.

When the distance between the start points is less than or equal to the first threshold value dt1 [m] (step S6: Y), the process proceeds to step S7. When the distance between the start points is not less than or equal to the first threshold value dt1 [m] (step S6: N), the process proceeds to step S11.

In step S7, the map information processing unit 33 determines whether or not the second lane L2 branches into separate routes, namely the second lane L2 and the third lane L3, beyond the start point of the second lane increasing section S2, based on the acquired map information. For example, the map information processing unit 33 determines whether or not a lane change between the second lane L2 and the third lane L3 becomes unable to be performed beyond the start point of the second lane increasing section S2. When the second lane L2 branches into separate routes, that is, the second lane L2 and the third lane L3 (step S7: Y), the process proceeds to step S8. When the second lane L2 does not branch into separate routes, that is, the second lane L2 and the third lane L3 (step S7: N), the process proceeds to step S11.

In step S8, the map information processing unit 33 determines in which of the second lane L2 and the third lane L3 the route information acquired by the navigation information acquisition unit 31 recommends the vehicle 1 to travel. When the third lane L3 is recommended (step S8: Y), the process proceeds to step S9. When the second lane L2 is recommended (step S8: N), the process proceeds to step S11.

In step S9, the map information processing unit 33 calculates a distance between start points from the start point of the second lane increasing section S2 to a start point P1 of a section in which the second lane L2 and the third lane L3 branch off from each other (hereinafter, sometimes referred to as "branch start point P1") and determines whether or not the distance between the start points is less than or equal to a second threshold value dt2 [m]. The branch start point P1 is, for example, a start point of a section in which a lane change between the second lane L2 and the third lane L3 becomes unable to be performed.

For example, as the second threshold value dt2, a difference (d3-d0) obtained by subtracting the above-described distance d0 from distance d3 described below may be set.

When the first threshold value dt1 is set as dt1=(d0+d2) and the second threshold value dt2 is set as dt2=(d3-d0) as described above, a larger second threshold value dt2 is set in the case where the first threshold value dt1 is small than in the case where the first threshold value dt1 is large. For example, the second threshold value dt2 is set in such a manner that the smaller the first threshold value dt1 is, the larger the second threshold value dt2 is.

The distance d3 is set as a margin distance that allows the vehicle 1 to perform a lane change to the third lane L3 by the autonomous travel control before the branch start point P1 even when the autonomous travel control cannot cause the vehicle 1 to move to the third lane L3 in accordance with increase in the lane width of the third lane L3. For example, the distance d3 may be 700 m.

When the distance between the start points is less than or equal to the second threshold value dt2 (step S9: Y), the process proceeds to step S10. When the distance between the start points is not less than or equal to the second threshold value dt2 (step S9: N), the process proceeds to step S11.

In step S10, the map information processing unit 33 determines not to perform the first lane change from the first lane L1 to the second lane L2 by the autonomous travel control but to demand the passenger to perform the first lane change by manual driving operation.

The lane change request determination unit 34 determines not to make a proposition of a lane change by the route travel assistance function but to generate a demand of a lane change by manual operation by the passenger.

Based on the determination result by the lane change request determination unit 34, the lane change state management unit 35 does not start a lane change by the autonomous travel control and outputs information prompting the passenger to manually perform a lane change by the display device 16 and the sound output device 17.

A driving scene in which such determination is made is a scene in which when the second lane change by the autonomous travel control cannot be performed since distance between the start points of the first and second lane changes is short, a demand of manual driving operation cannot be output with sufficient margin for the passenger to perform a lane change by manual driving operation and thus the passenger cannot perform a lane change with sufficient margin.

In such a case, instead of outputting information at a time point of the second lane change, generating a demand of lane change by manual driving operation at a point before the start point of the first lane change enables the passenger to manually perform both the first and second lane changes with sufficient margin.

On the other hand, in step S11, the map information processing unit 33 determines to perform the first lane change from the first lane L1 to the second lane L2 by the autonomous travel control. The lane change request determination unit 34 determines to make a proposition of a lane change by the route travel assistance function.

The lane change state management unit 35 proposes a lane change by the autonomous travel control, using the display device 16 and the sound output device 17, based on the determination by the lane change request determination unit 34. When the passenger accepts the proposition, the vehicle 1 starts the first lane change from the first lane L1 to the second lane L2.

When it is determined that the second lane change cannot be performed after the first lane change is performed, the lane change state management unit 35 generates a demand of lane change by manual driving operation. However, since, in this state, sufficient distance to perform the second lane change is provided, the passenger is able to manually perform the second lane change with sufficient margin.

Note that, in the driving assistance method of the present embodiment, the distance from the start point of the first lane increasing section S1 to the branch start point P1 at which the second lane L2 and the third lane L3 branch off from each other is separated into the distance between the start point of the first lane increasing section S1 and the start point of the second lane increasing section S2 and the distance from the start point of the second lane increasing section S2 to the branch start point P1 and, by individually comparing the distances with the threshold values dt1 and dt2, whether or not the first lane change by the autonomous travel control is performed is determined (steps S6 and S9).

Because of this configuration, when it is impossible to notify the passenger with sufficient margin that when the distance between the start point of the first lane increasing section S1 and the start point of the second lane increasing section S2 is shorter than the first threshold value dt1 and the distance from the start point of the second lane increasing section S2 to the branch start point P1 is shorter than the second threshold value dt2 (Y in steps S6 and S9), the second lane change by the autonomous travel control cannot be performed, it is possible to demand the passenger to perform the first lane change by manual driving operation.

On the other hand, since, in the case where, even when the distance from the start point of the second lane increasing section S2 to the branch start point P1 is shorter than the second threshold value dt2 (Y in step S9), the distance between the start point of the first lane increasing section S1 and the start point of the second lane increasing section S2 is longer than the first threshold value dt1 (N in step S6), the distance between the start point of the first lane increasing section S1 and the start point of the second lane increasing section S2 is long, it is possible to notify the passenger with sufficient margin that the second lane change by the autonomous travel control cannot be performed.

In this case, by performing the first lane change by the autonomous travel control, a load of lane change operation by the passenger can be reduced.

(Advantageous Effects of Embodiment)

(1) The controller 20 performs a lane change of the vehicle 1 by the autonomous travel control. The navigation system 15 calculates a target route along which the vehicle 1 is caused to travel to a destination. The controller 20 determines whether or not multiple lane changes are required to be performed successively for the vehicle 1 to travel in accordance with the target route, determines whether or not lane changes are performed by the autonomous travel control, and when a determination result includes a determination that, in the second or later lane changes among the multiple lane changes, a lane change is not performed by the autonomous travel control, does not perform the first lane change by the autonomous travel control.

Since this configuration enables switch from autonomous driving to manual driving in the middle of successive multiple lane changes to be prevented from occurring, the passenger who is demanded to manually perform lane changes can perform the multiple lane changes with sufficient margin.

(2) The controller 20 may determine whether or not, in a first lane increasing section in which a first lane on a first road branches into a second lane extending to a second road branching off from the first road and the first lane, it is required to perform the first lane change from the first lane to the second lane, determine whether or not, in a second lane increasing section in which the second lane branches into a third lane extending to a third road branching off from the second road and the second lane, it is required to perform the second lane change from the second lane to the third lane, and determine whether or not the second lane change is performed by the autonomous travel control, based on whether or not distance between a start point of the first lane increasing section and a start point of the second lane increasing section is longer than a first threshold value dt1.

This configuration enables whether or not the second lane change is performed by the autonomous travel control to be determined based on distance between points at which the first lane change and the second lane change are performed.

(3) The controller 20 may set the first threshold value dt1 according to an increase rate of lane width of the third lane with respect to positional change in a travel direction of the third lane in the second lane increasing section and/or vehicle speed.

This configuration enables the first threshold value dt1 to be set according to slowness and quickness of steering when a lane change is performed in the second lane increasing section.

(4) The controller 20 may determine not to perform the second lane change by the autonomous travel control when distance between a start point of a section in which a lane change from the second lane to the third lane cannot be performed and the start point of the second lane increasing section is less than or equal to a second threshold value dt2 and the distance between the start point of the first lane increasing section and the start point of the second lane increasing section is less than or equal to the first threshold value dt1.

This configuration enables whether or not the second lane change is performed by the autonomous travel control to be determined depending on the distance between the start point of the section in which a lane change from the second lane to the third lane cannot be performed and the start point of the second lane increasing section.

(5) The controller 20 may set the second threshold value dt2 according to an increase rate of lane width of the third lane with respect to positional change in the travel direction of the third lane in the second lane increasing section and/or vehicle speed. This configuration enables the second threshold value dt2 to be set according to slowness and quickness of steering when a lane change is performed in the second lane increasing section.

(6) The controller 20 may generate information prompting the passenger to manually perform the first lane change when a determination result includes a determination that, in the second or later lane changes, a lane change is not performed by the autonomous travel control.

Because of this configuration, when a determination result includes a determination that, in the second or later lane changes, a lane change is not performed by the autonomous travel control, instead of outputting information at a time point at which the second or later lane changes by the autonomous travel control cannot be performed, outputting information at a point before the start point of the first lane change enables the passenger to manually perform both the first and second lane changes with sufficient margin.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Vehicle
10 Driving assistance device
11 Sensor
12 Positioning device
13 Map database
14 In-vehicle device
15 Navigation system
16 Display device
17 Sound output device
18 Input device
19 Vehicle behavior control device
20 Controller
21 Processor
22 Storage device 30 Map information acquisition unit
31 Navigation information acquisition unit
32 Self-position information acquisition unit
33 Map information processing unit
34 Lane change request determination unit
35 Lane change state management unit

The invention claimed is:

1. A driving assistance method for performing a lane change of an own vehicle by autonomous travel control, the driving assistance method comprising:
   calculating a target route along which the own vehicle is caused to travel to a destination;
   determining whether or not multiple lane changes are required to be performed successively for the own vehicle to travel in accordance with the target route;
   determining whether or not a second lane change among the multiple lane changes will be performed by the autonomous travel control; and
   in response to a determination being made that the second lane change will not be performed by the autonomous travel control, not performing a first lane change by the autonomous travel control even when the first lane change can be performed by the autonomous travel control,
   wherein the first lane change is a lane change from a first lane to a second lane and the second lane change is a lane change from the second lane to a third lane different from the first lane.

2. The driving assistance method according to claim 1, wherein
   the first lane change is a lane change from the first lane on a first road to the second lane extending to a second road branching off from the first road in a first lane increasing section in which the first lane branches into the second lane and the first lane,
   the second lane change among the multiple lane changes is a lane change from the second lane to the third lane extending to a third road branching off from the second road in a second lane increasing section in which the second lane branches into the third lane and the second lane, and
   the driving assistance method determines whether or not the second lane change is performed by the autonomous travel control, based on whether or not distance between a start point of the first lane increasing section and a start point of the second lane increasing section is longer than a first threshold value.

3. The driving assistance method according to claim 2, wherein the driving assistance method sets the first threshold value according to an increase rate of lane width of the third lane with respect to positional change in a travel direction of the third lane in the second lane increasing section and/or vehicle speed.

4. The driving assistance method according to claim 2, wherein the driving assistance method determines not to perform the second lane change by the autonomous travel control when distance between a start point of a section in which a lane change from the second lane to the third lane becomes unable to be performed and the start point of the second lane increasing section is less than or equal to a second threshold value and distance between a start point of the first lane increasing section and a start point of the second lane increasing section is less than or equal to the first threshold value.

5. The driving assistance method according to claim 4, wherein the driving assistance method sets the second threshold value according to an increase rate of lane width of the third lane with respect to positional change in a travel direction of the third lane in the second lane increasing section and/or vehicle speed.

6. The driving assistance method according to claim 1, wherein the driving assistance method generates information prompting a passenger to manually perform the first lane change when the determination is made that the second lane change will not be performed by the autonomous travel control.

7. A driving assistance device for performing a lane change of an own vehicle by autonomous travel control, the driving assistance device comprising a controller configured:
   to calculate a target route along which the own vehicle is caused to travel to a destination;
   to determine whether or not multiple lane changes are required to be performed successively for the own vehicle to travel in accordance with the target route;
   to determine whether or not a second lane change among the multiple lane changes will be performed by the autonomous travel control; and
   in response to a determination being made that the second lane change will not be performed by the autonomous travel control, not to perform a first lane change by the autonomous travel control even when the first lane change can be performed by the autonomous travel control,
   wherein the first lane change is a lane change from a first lane to a second lane and a second lane change is a lane change from the second lane to a third lane different from the first lane.

8. A driving assistance method for performing a lane change of an own vehicle by autonomous travel control, the driving assistance method comprising:
   determining whether two or more lane changes are required to be performed successively within a predetermined time or distance for the own vehicle to travel in accordance with a target route in a destination; and
   in response to a determination that a second or later lane change among the two or more lane changes will not be performed by the autonomous travel control, not performing a first lane change among the two or more lane changes by the autonomous travel control.

* * * * *